(12) United States Patent
Sen et al.

(10) Patent No.: US 10,477,433 B2
(45) Date of Patent: Nov. 12, 2019

(54) MOBILITY-AWARE FRAME AGGREGATION

(71) Applicant: Hewlett Packard Enterprise Development LP, Houston, TX (US)

(72) Inventors: Souvik Sen, Mountain View, CA (US); Li Sun, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 17 days.

(21) Appl. No.: 15/326,029

(22) PCT Filed: Jul. 30, 2014

(86) PCT No.: PCT/US2014/048862
§ 371 (c)(1),
(2) Date: Jan. 12, 2017

(87) PCT Pub. No.: WO2016/018294
PCT Pub. Date: Feb. 4, 2016

(65) Prior Publication Data
US 2017/0223570 A1    Aug. 3, 2017

(51) Int. Cl.
*H04W 28/06* (2009.01)
*H04B 7/06* (2006.01)
*H04L 12/26* (2006.01)

(52) U.S. Cl.
CPC ........ *H04W 28/065* (2013.01); *H04B 7/0626* (2013.01); *H04L 43/0852* (2013.01); *H04L 43/0894* (2013.01); *H04W 28/06* (2013.01)

(58) Field of Classification Search
CPC ..... H04L 1/0079; H04L 5/005; H04L 5/0048; H04L 1/0007; H04W 72/044; H04W 72/1221; H04W 74/04; H04W 4/00; H04W 28/06; H04W 28/065; H04W 74/0816; H04B 7/0626
USPC ....... 370/252, 312, 330, 336, 338, 470, 473, 370/474
See application file for complete search history.

(56) References Cited

U.S. PATENT DOCUMENTS

| 7,460,524 | B2 | 12/2008 | Khan |
| 7,474,676 | B2 | 1/2009 | Tao et al. |
| 7,701,975 | B1 * | 4/2010 | Tsang .................. H04L 1/0079 370/252 |
| 7,801,174 | B2 | 9/2010 | Joshi et al. |
| 8,001,143 | B1 | 8/2011 | Gupta |

(Continued)

FOREIGN PATENT DOCUMENTS

WO    WO-2008070738    6/2008

OTHER PUBLICATIONS

Cezary Ziółkowski; Practical Aspects of the Doppler Effect in Mobile Communication Systems, IEEE Xplore (Year: 2008).*

(Continued)

*Primary Examiner* — Harun Chowdhury
(74) *Attorney, Agent, or Firm* — Mannava & Kang, P.C.

(57) ABSTRACT

According to an example, mobility-aware frame aggregation may include using mobility information related to a transmitter and/or a receiver associated with transmission of data over a wireless channel to determine an aggregation size for frame aggregation of the data to be transmitted over the wireless channel. The mobility information may be based on subcarriers and antennas related to the wireless channel.

16 Claims, 5 Drawing Sheets

(56) References Cited

U.S. PATENT DOCUMENTS

| | | |
|---|---|---|
| 8,554,148 B2 | 10/2013 | Lee et al. |
| 2005/0122960 A1 | 6/2005 | Khan |
| 2006/0056443 A1 | 3/2006 | Tao et al. |
| 2010/0202418 A1* | 8/2010 | Barrett .............. H04W 72/1221 370/336 |
| 2011/0170525 A1* | 7/2011 | Lee ...................... H04W 74/04 370/338 |
| 2013/0195002 A1* | 8/2013 | Walker ................... H04L 5/005 370/312 |
| 2013/0250796 A1 | 9/2013 | Frankkila et al. |
| 2014/0064120 A1* | 3/2014 | Sethuraman .......... H04W 24/02 370/252 |
| 2014/0219237 A1* | 8/2014 | Charbit ............... H04W 72/044 370/330 |

OTHER PUBLICATIONS

Kim, Y et al, "Throughput Enhancement of IEEE 802.11 WLAN via Frame Aggregation", Jun. 13, 2014.
Skordoulls, D et al, "IEEE 802.11N MAC Frame Aggregation Mechanisms for Next-Generation High-Throughput WLANS", Feb. 2008.
Pefkianakis et al., "MIMO rate adaptation in 802.11n wireless networks", Proceedings of the sixteenth annual international conference on Mobile computing and networking. ACM, 2010, pp. 257-268.
International Search Report and Written Opinion received for PCT Application No. PCT/US2014/048862, dated Apr. 24, 2015, 10 pages.

* cited by examiner

300

USE CHANNEL STATE INFORMATION (CSI) TO DETERMINE A
CHANNEL COHERENCE TIME FOR A WIRELESS CHANNEL
BETWEEN A MOBILE DEVICE AND A WIRELESS ACCESS POINT (AP)
302

↓

DETERMINE A BIT-RATE SUPPORTED BY THE
WIRELESS CHANNEL
304

↓

USE THE CHANNEL COHERENCE TIME AND THE BIT RATE
SUPPORTED BY THE WIRELESS CHANNEL TO DETERMINE AN
AGGREGATION SIZE FOR FRAME AGGREGATION OF PACKETS
TO BE TRANSMITTED OVER THE WIRELESS CHANNEL
306

USE MOBILITY INFORMATION RELATED TO A TRANSMITTER AND/OR A RECEIVER ASSOCIATED WITH TRANSMISSION OF DATA OVER A WIRELESS CHANNEL TO DETERMINE AN AGGREGATION SIZE FOR FRAME AGGREGATION OF THE DATA TO BE TRANSMITTED OVER THE WIRELESS CHANNEL
402

FIG. 4

MOBILITY-AWARE FRAME AGGREGATION

BACKGROUND

Wireless networks typically support frame aggregation to increase throughput by sending two or more data frames in a single transmission without any inter-packet gaps. Every frame transmitted by a device typically includes overhead, for example, based on radio level headers, Media Access Control (MAC) frame fields, interframe spacing, and/or acknowledgment of transmitted frames. At certain data rates, this overhead consumes more bandwidth than the payload data frame. Frame aggregation thus groups several data frames into one large frame based on attributes of a wireless channel. Since management information is typically specified once per frame, the ratio of payload data to the total volume of data is higher, and allows for higher throughput. The wireless channel that is used for frame transmission is typically estimated at the beginning of a frame reception.

BRIEF DESCRIPTION OF DRAWINGS

Features of the present disclosure are illustrated by way of example and not limited in the following figure(s), in which like numerals indicate like elements, in which:

FIG. 3 illustrates a method for mobility-aware frame aggregation, according to an example of the present disclosure;

FIG. 4 illustrates further details of the method for mobility-aware frame aggregation, according to an example of the present disclosure.

DETAILED DESCRIPTION

Figure 1:
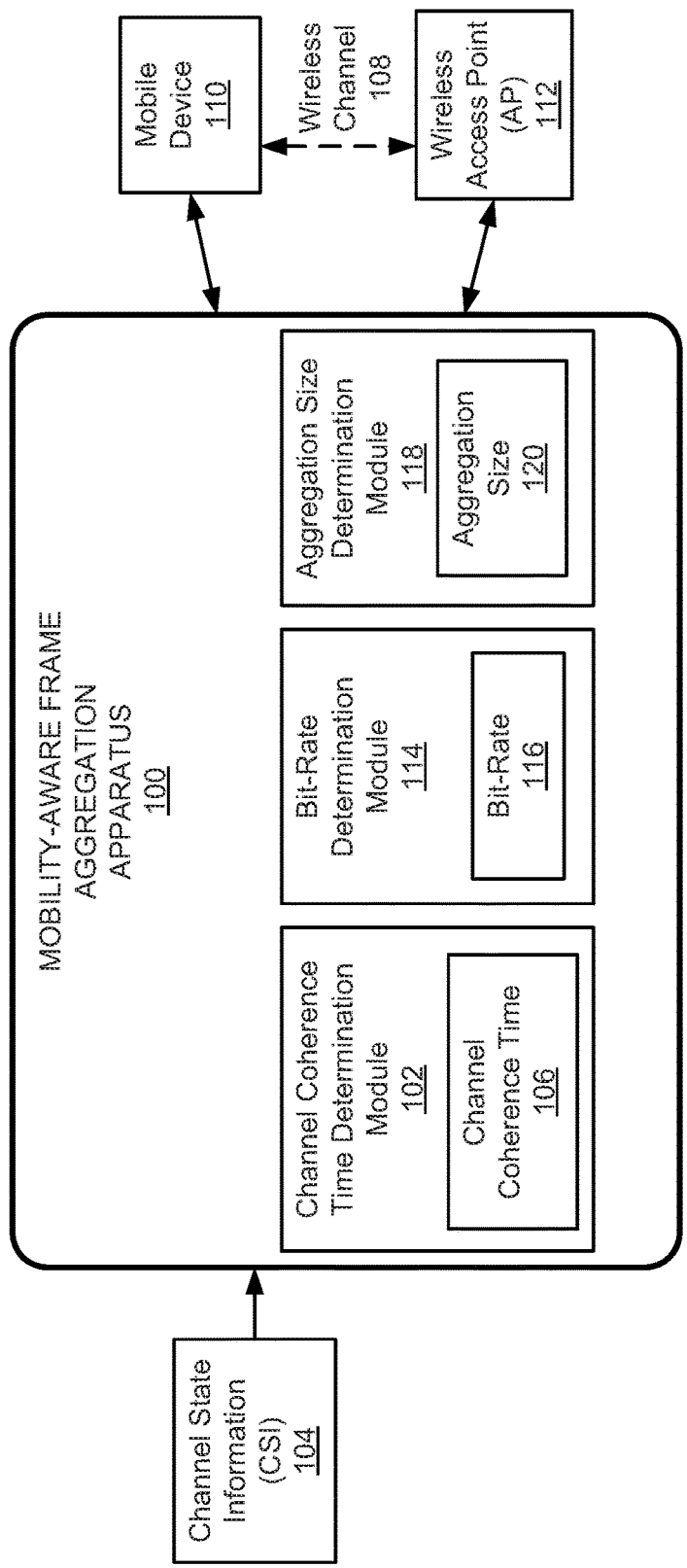
FIG. 1 illustrates an architecture of a mobility-aware frame aggregation apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to frame aggregation, generally aggregating more packets (i.e., data frames) results in higher throughput by reducing protocol overheads. However, in mobile scenarios (e.g., during movement of a mobile device and/or a wireless access point (AP)), aggregation of packets may have a negative impact on performance. This is because mobility intensifies the time-varying nature of the wireless channel between the mobile device and the wireless AP. For example, under mobility, if relatively long aggregated frames are used, the throughput may reduce. For example, under certain conditions, the throughput may reduce by up to 25%. In mobility scenarios, the throughput of the wireless channel may actually decrease as the aggregation size is increased. This occurs because under mobility the wireless channel may change rapidly. The channel equalization procedure employed by typical wireless devices estimates channel parameters at the beginning of the frame reception to decode the frame. Under mobility, the channel may change by the end of the frame (i.e., before completion of frame reception), which results in packet losses. Thus, the longer the aggregation size, the higher the probability of channel change within the aggregate frame, and the higher the probability of packet loss.

According to examples, a mobility-aware frame aggregation apparatus and a method for mobility-aware frame aggregation are disclosed herein. The apparatus and method disclosed herein generally provide for dynamic adaptation of the frame aggregation size to make the frame aggregation size robust against a time-varying wireless channel (e.g., during movement of a mobile device and/or a wireless AP). The apparatus and method disclosed herein use the channel state information (CSI) to determine the time-varying characteristics of a wireless channel. The CSI may be used to determine how quickly the wireless channel is changing (e.g., during movement of a mobile device and/or a wireless AP), and thereafter determine an aggregation size that is commensurate to the rate of change of the wireless channel.

According to an example, the mobility-aware frame aggregation apparatus may include a processor, and a memory storing machine readable instructions that when executed by the processor cause the processor to determine an aggregation size for frame aggregation of data to be transmitted over a wireless channel based on changes in CSI. The aggregation size pertains to a maximum number of packets that may be aggregated in a frame and transmitted using the wireless channel without undergoing transmission failure. The CSI is used to determine a channel coherence time for the wireless channel, where the channel coherence time is a time duration during which the wireless channel changes due to movement of the mobile device and/or the wireless AP by less than a predetermined value (e.g., 5%). The wireless AP may include a WiFi, cellular, or other such technology based AP. In this regard, if the aggregation time (i.e., time duration to transmit an aggregated frame) is less than the channel coherence time, the aggregated frame does not undergo losses. This is because the wireless channel is expected to remain stable during its channel coherence time, and not change within the duration of the aggregated frame. The channel coherence time and bit-rate supported by the wireless channel may be used to determine an aggregation size for frame aggregation of packets to be transmitted over the wireless channel. In order to determine the channel coherence time, CSI values are determined for a time period, and a maximum time lag is determined within the time period for which a similarity between the CSI values that are determined for the time period is greater than a further predetermined value (e.g., 95%). The maximum time lag represents the channel coherence time.

FIG. 1 illustrates an architecture of a mobility-aware frame aggregation apparatus (hereinafter also referred to as "apparatus 100"), according to an example of the present disclosure. Referring to FIG. 1, the apparatus 100 is depicted as including a channel coherence time determination module 102 to use CSI 104 to determine a channel coherence time 106 for a wireless channel 108 between a mobile device 110 and a wireless access point (AP) 112. The channel coherence time 106 may represent a time duration during which the wireless channel 108 changes due to movement of the mobile device and/or the wireless AP 112 by less than a predetermined value. According to an example, the predetermined value is approximately 5%. Thus, according to the example, the channel coherence time 106 may be defined as the time duration during which the wireless channel 108 does not change by more than approximately 5%.

A bit-rate determination module 114 is to determine a bit-rate 116 supported by the wireless channel 108. The bit-rate 116 supported by the wireless channel 108 may represent a maximum number of bits that are to be transmitted, for example, every one second, using the wireless channel 108 without transmission failure.

An aggregation size determination module 118 is to use the channel coherence time 106 and the bit-rate 116 supported by the wireless channel 108 to determine an aggregation size 120 for frame aggregation of packets (i.e., data frames, or data generally) to be transmitted over the wireless channel 108.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

With respect to the CSI 104, the CSI 104 may represent physical (PHY) layer information that reports channel metrics for the wireless channel 108 in the frequency domain. The CSI 104 may capture the delay and attenuation of different signal paths traversing from the mobile device 110 to the wireless AP 112. If the mobile device 110 transmits a symbol X, the quality of the received symbol at the wireless AP 112, Y, depends on the CSI H as follows:

$$Y=H*X+n \qquad \text{Equation (1)}$$

For Equation (1), H may represent the channel matrix for the wireless channel 108, and n may represent the noise vector. The CSI 104 may be represented as a vector which includes complex numbers representing the channel gain for every subcarrier (i.e. sub-channel) and for every transmit-receive antenna pair. For example, assuming the wireless AP 112 includes 52 subcarriers (i.e., m subcarriers) and 3 antennas (i.e., p antennas), in this example, the CSI 104 may be represented as a complex vector of size 52×3 (i.e., m×p). Thus, the CSI 104 may be determined as a function of a number of subcarriers and antennas supported by the wireless AP 112. The channel coherence time 106 may be determined by computing the rate of chance in the CSI 104.

Referring to FIG. 1, the channel coherence time determination module 102 may use the CSI 104 to determine the channel coherence time 106 for the wireless channel 108 between the mobile device 110 and the wireless AP 112. The channel coherence time determination module 102 may determine CSI values for a predetermined time period, and determine a maximum time lag within the predetermined time period for which a similarity between the CSI values that are determined for the predetermined time period is greater than a further predetermined value. The maximum time lag may represent the channel coherence time 106. The predetermined time period may include a time period, for example, from time=0 to time=x, where x covers a range of time where the further predetermined value is less than 95% (e.g., see FIG. 2, where x=20 ms). According to an example, the further predetermined value is approximately 95%.

With respect to similarity between the CSI values that are determined for the predetermined time period, the similarity between two CSI values may be determined using correlation. The correlation between $CSI_i$ and $CSI_{i+k}$ may be defined as follows:

$$\text{Corr}(CSIi, CSIi+k) = \frac{\sum_{x=1}^{n}(CSI_i^x - \overline{CSI^i})(CSI_{i+k}^x - \overline{CSI^J})}{\sqrt{\sum_{x=1}^{n}(CSI_i^x - \overline{CSI^i})^2 \sum_{x=1}^{n}(CSI_{i+k}^x - \overline{CSI^J})^2}} \qquad \text{Equation (2)}$$

For Equation (2), $CSI_i$ may represent a CSI sample determined at time $t_i$ on one antenna (e.g., the first antenna p). Assuming there are m numbers (e.g., 52 numbers) in $CSI_i$, each number in $CSI_i$ is a real number representing the magnitude value on its corresponding subcarrier. In Equation (2), $CSI_i^x$ may represent one number out of m in $CSI_i$ with index x, and $\overline{CSI^i}$ may represent the average value of all m numbers in $CSI_i$. Similarly, $CSI_{i+k}$ (or CSIi+k in Equation (2)) may represent a CSI sample determined at time $t_{i+k}$ on one antenna (e.g., the first antenna), where k is a time value in milliseconds. In Equation (2), $CSI_i^x$ may represent one number out of m in $CSI_{i+k}$ with index x, and $\overline{CSI^J}$ may represent the average values of all in numbers in $CSI_{i+k}$.

The channel coherence time 106 may be defined as the maximum time lag k such that the similarity between $CSI_i$ and $CSI_{i+k}$ is more than a predetermined value (e.g., 0.95, or 95%). Beyond the channel coherence time, the similarity between the two CSI values may be less than 0.95 indicating a sufficient change in the wireless channel 108, which may result in transmission failure.

The channel coherence time determination module 102 may use Equation (2) to determine the CSI correlation value/coefficient of $CSI_i$ and $CSI_{i+k}$ on the first antenna of the p antennas (i.e., to determine one correlation value). Similarly, the channel coherence time determination module 102 may use Equation (2) to determine the CSI correlation value/coefficient of $CSI_i$ and $CSI_{i+k}$ on each of the remaining p antennas i.e., additional correlation values from the remaining antennas, where the wireless AP 112 may report one CSI sample on each antenna at each time). Thus, the channel coherence time determination module 102 may use Equation (2) to determine p correlation values from CSI samples at time $t_i$ and time $t_{i+k}$. These p correlation values may be averaged, and the average value may be used by the channel coherence time determination module 102 to determine the channel coherence time 106.

According to an example, assuming a mobile device 110 associated with a wireless AP 112 is moving, given a time lag of k ms between time $t_i$ and $t_{i+k}$, the wireless AP 112 may report the CSI information at time $t_i$ and $t_{i+k}$, respectively. The channel coherence time determination module 102 may use Equation (2) to determine p CSI correlation values on p antennas, based on which an average CSI correlation value may be determined.

Figure 2:
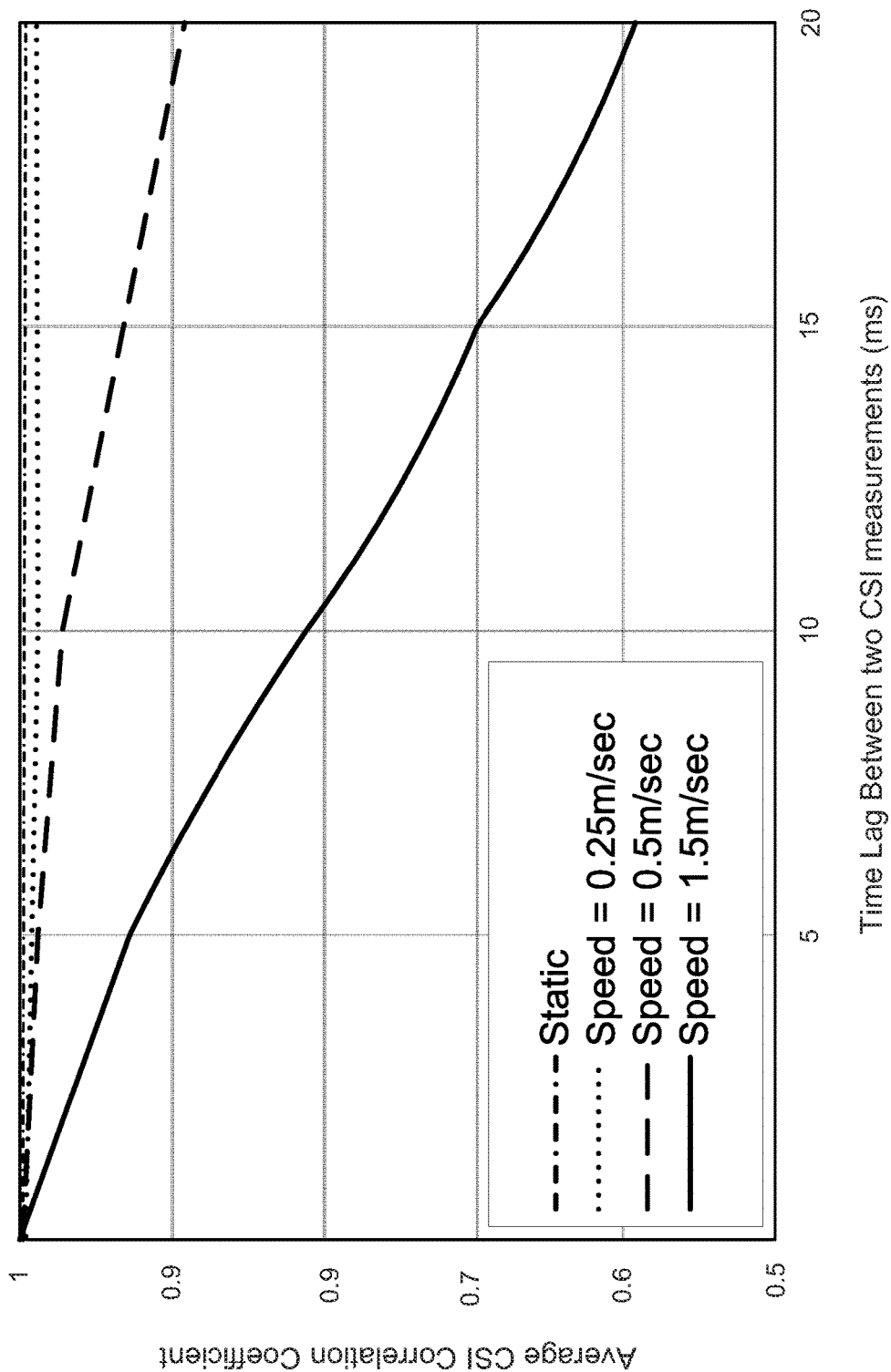
FIG. 2 illustrates a graph of average channel state information (CSI) correlation coefficient values for different time lags, according to an example of the present disclosure.

FIG. 2 illustrates a graph of CSI correlation values for different time lags, according to an example of the present disclosure. Referring to FIG. 2, the average CSI correlation coefficient decreases as the measurement time lag increases in mobility. Therefore, the larger the measurement time lag, the lower the average CSI correlation coefficient. Similarly, the lower the average CSI correlation coefficient, the larger the measurement time lag. The maximum time lag at which the correlation value is greater than, for example, 0.95, may indicate the channel coherence time 106. For example, for FIG. 2, for speed=1.5 m/sec, the maximum time-lag is approximately 4 ms. The channel coherence time 106 may indicate the maximum aggregation time that is supported by the wireless channel 108.

In order to determine the aggregation size 120, based on an average CSI correlation coefficient from the time lag k, suppose k is the maximum time lag at which the average CSI correlation coefficient is still larger than the threshold 0.95, then the aggregation size determination module 118 may choose k as the channel coherence time 106. The value k may be used to determine the maximum aggregation time that the current wireless channel 108 may support. Assuming that the current bit-rate 116 for the wireless channel 108 is r, where r is a data rate value in Mbit/s, then the aggregation size determination module 118 may determine the aggregation size 120 as follows:

$$\text{Aggregation Size} = r * k \quad \text{Equation (3)}$$

The aggregation size 120 may be re-determined as needed, for example, at every y seconds (i.e., at a predetermined time interval). Alternatively or additionally, the aggregation size 120 may be re-determined as needed based on whether the mobility speed of the mobile device remains the same (thus no re-determination needed), or whether the mobility speed of the mobile device has changed by greater than a predetermined percentage (e.g., greater than 10%).

FIGS. 3 and 4 respectively illustrate flowcharts of methods 300 and 400 for mobility-aware frame aggregation, corresponding to the example of the mobility-aware frame aggregation apparatus 100 whose construction is described in detail above. The methods 300 and 400 may be implemented on the mobility-aware frame aggregation apparatus 100 with reference to FIGS. 1 and 2 by way of example and not limitation. The methods 300 and 400 may be practiced in other apparatus.

Referring to FIG. 3, for the method 300, at block 302, the method may include using CSI to determine a channel coherence time for a wireless channel between a mobile device and a wireless AP. The channel coherence time may represent a time duration during which the wireless channel changes due to movement of the mobile device and/or the wireless AP by less than a predetermined value. For example, referring to FIG. 1, the channel coherence time determination module 102 may use the CSI 104 to determine the channel coherence time 106 for the wireless channel 108 between the mobile device 110 and the wireless AP 112. According to an example, the predetermined value is approximately 5%.

At block 304, the method may include determining a bit-rate supported by the wireless channel. For example, referring to FIG. 1, the bit-rate determination module 114 may determine the bit-rate 116 supported by the wireless channel 108.

At block 306, the method may include using the channel coherence time and the bit rate supported by the wireless channel to determine an aggregation size for frame aggregation of packets to be transmitted over the wireless channel. For example, referring to FIG. 1, the aggregation size determination module 118 may use the channel coherence time 106 and the bit-rate 116 supported by the wireless channel 108 to determine the aggregation size 120 for frame aggregation of packets (i.e., data frames, or data generally) to be transmitted over the wireless channel 108.

According to an example, using CSI to determine a channel coherence time for a wireless channel between a mobile device and a wireless AP may further include determining CSI values for a predetermined time period, and determining a maximum time lag within the predetermined time period for which a similarity between the CSI values that are determined for the predetermined time period is greater than a further predetermined value. The maximum time lag may represent the channel coherence time. According to an example, the further predetermined value is approximately 95%.

According to an example, the method 300 may further include determining the similarity between the CSI values based on a correlation between the CSI values (e.g., by using Equation (2)).

According to an example, the method 300 may further include determining the CSI as a function of a number of subcarriers and antennas supported by the wireless AP (e.g., as discussed with respect to Equation (2)).

According to an example, the method 300 may further include using the determined aggregation size for frame aggregation of packets, and transmitting the packets over the wireless channel.

Referring to FIG. 4, for the method 400, at block 402, the method may include using mobility information related to a transmitter and/or a receiver associated with transmission of data over a wireless channel to determine an aggregation size for frame aggregation of the data to be transmitted over the wireless channel. For example, referring to FIG. 1, the channel coherence time determination module 102 and the aggregation size determination module 118 may use mobility information (e.g., the CSI 104) related to a transmitter and/or a receiver associated with transmission of data over the wireless channel 108 to determine an aggregation size 120 for frame aggregation of the data to be transmitted over the wireless channel 108. The mobility information may be based on subcarriers and antennas related to the wireless channel 108.

According to an example, the mobility information is based on changes in the subcarriers and the antennas determined from CSI (e.g., as discussed with respect to Equation (2)).

According to an example, the method 400 may further include using the mobility information to determine a channel coherence time 106 for the wireless channel 108 (e.g., by using the channel coherence time determination module 102). The channel coherence time 106 may represent a time duration during which the wireless channel 108 changes due to movement of the mobile device 110 and/or the wireless AP 112 by less than a user-specified value (e.g., approximately 5%).

Figure 5:
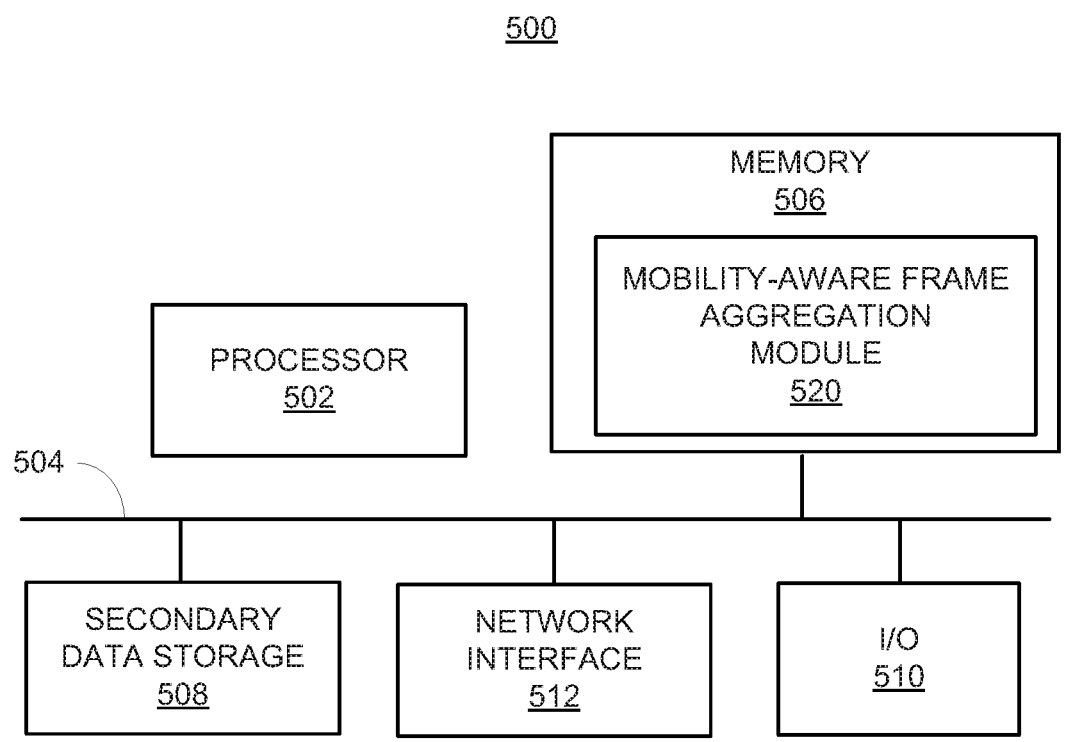
FIG. 5 illustrates a computer system, according to an example of the present disclosure.

FIG. 5 shows a computer system 500 that may be used with the examples described herein. The computer system 500 may represent a generic platform that includes components that may be in a server or another computer system. The computer system 500 may be used as a platform for the apparatus 100. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include a mobility-aware frame aggregation module 520 including machine readable instructions residing in the memory 506 during runtime and executed by the processor 502. The mobility-aware frame aggregation module 520 may include the modules of the apparatus 100 shown in FIG. 1.

The computer system 500 may include an I/O device 510, such as a keyboard, a mouse, a display, etc. The computer system may include a network interface 512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for mobility-aware frame aggregation, the method comprising:
 using channel state information (CSI) to determine, by a processor, a channel coherence time for a wireless channel between a mobile device and a wireless access point (AP), wherein the channel coherence time is a time duration during which the wireless channel changes due to movement of at least one of the mobile device and the wireless AP by less than a predetermined value;
 determining a bit-rate supported by the wireless channel;
 using a product of the channel coherence time and the bit rate supported by the wireless channel to determine an aggregation size for frame aggregation of packets to be transmitted over the wireless channel;
 using the determined aggregation size for frame aggregation of packets; and
 transmitting the packets over the wireless channel.

2. The method of claim 1, wherein the predetermined value is approximately 5%.

3. The method of claim 1, wherein using CSI to determine a channel coherence time for a wireless channel between a mobile device and a wireless AP further comprises:
 determining CSI values for a predetermined time period; and
 determining a maximum time lag within the predetermined time period for which a similarity between the CSI values that are determined for the predetermined time period is greater than a further predetermined value, wherein the maximum time lag represents the channel coherence time.

4. The method of claim 3, wherein the further predetermined value is approximately 95%.

5. The method of claim 3, further comprising:
 determining the similarity between the CSI values based on a correlation between the CSI values.

6. The method of claim 1, further comprising:
 determining the CSI as a function of a number of subcarriers and antennas supported by the wireless AP.

7. The method of claim 1, wherein the bit-rate supported by the wireless channel represents a maximum number of bits that are to be transmitted using the wireless channel without transmission failure.

8. The method of claim 5, further comprising:
 determining a correlation value, for each antenna of a plurality of antennas, based on the correlation between the CSI values;
 averaging the correlation values for the plurality of antennas; and
 determining the aggregation size based on the average correlation value.

9. A mobility-aware frame aggregation apparatus comprising:
 a processor; and
 a memory storing machine readable instructions that when executed by the processor cause the processor to:
  determine channel state information (CSI) values for a time period;
  determine, using the CSI values for the time period, an average CSI correlation coefficient for a plurality of antennas;
  determine an aggregation size for frame aggregation of data to be transmitted over a wireless channel based on the average CSI correlation coefficient;
  use the determined aggregation size for frame aggregation of packets; and
  transmit the packets over the wireless channel.

10. The mobility-aware frame aggregation apparatus of claim 9, wherein the machine readable instructions to determine an aggregation size for frame aggregation of data to be transmitted over a wireless channel based on changes in CSI, further cause the processor to:
 determine a maximum time lag within the time period for which the average CSI correlation coefficient is greater than a predetermined value, wherein the aggregation size is based on the maximum time lag.

11. The mobility-aware frame aggregation apparatus of claim 10, wherein the machine readable instructions when executed by the processor cause the processor to:
 use a product of the maximum time lag and a bit rate supported by the wireless channel between a mobile device and a wireless access point (AP) to determine the aggregation size for frame aggregation of data to be transmitted over the wireless channel.

12. The mobility-aware frame aggregation apparatus of claim 11, wherein the bit-rate supported by the wireless channel represents a maximum number of bits that are to be transmitted using the wireless channel without transmission failure.

13. A non-transitory computer readable medium having stored thereon machine readable instructions to provide mobility-aware frame aggregation, the machine readable instructions, when executed, cause a processor to:
 use mobility information related to at least one of a transmitter and a receiver associated with transmission of data over a wireless channel to determine a channel coherence time for the wireless channel, wherein the mobility information is based on an average correlation value determined based on a plurality of subcarriers and a plurality of antennas related to the wireless channel, wherein the channel coherence time is a time duration during which the wireless channel changes due to movement of at least one of a mobile device and a wireless access point (AP) by less than a user-specified value;

use the channel coherence time to determine an aggregation size for frame aggregation of the data to be transmitted over the wireless channel;

use the determined aggregation size for frame aggregation of packets; and transmit the packets over the wireless channel.

14. The non-transitory computer readable medium of claim 13, wherein the mobility information is based on changes in the plurality of subcarriers and the plurality of antennas determined from channel state information (CSI).

15. The non-transitory computer readable medium of claim 13, the machine readable instructions, when executed, cause a processor to:

use a product of the channel coherence time and a bit rate supported by the wireless channel to determine the aggregation size.

16. The non-transitory computer readable medium of claim 15, wherein the bit-rate supported by the wireless channel represents a maximum number of bits that are to be transmitted using the wireless channel without transmission failure.

* * * * *